E. E. GRAY.
GEAR SHIFTING MECHANISM.
APPLICATION FILED AUG. 18, 1913.
1,199,889.
Patented Oct. 3, 1916.
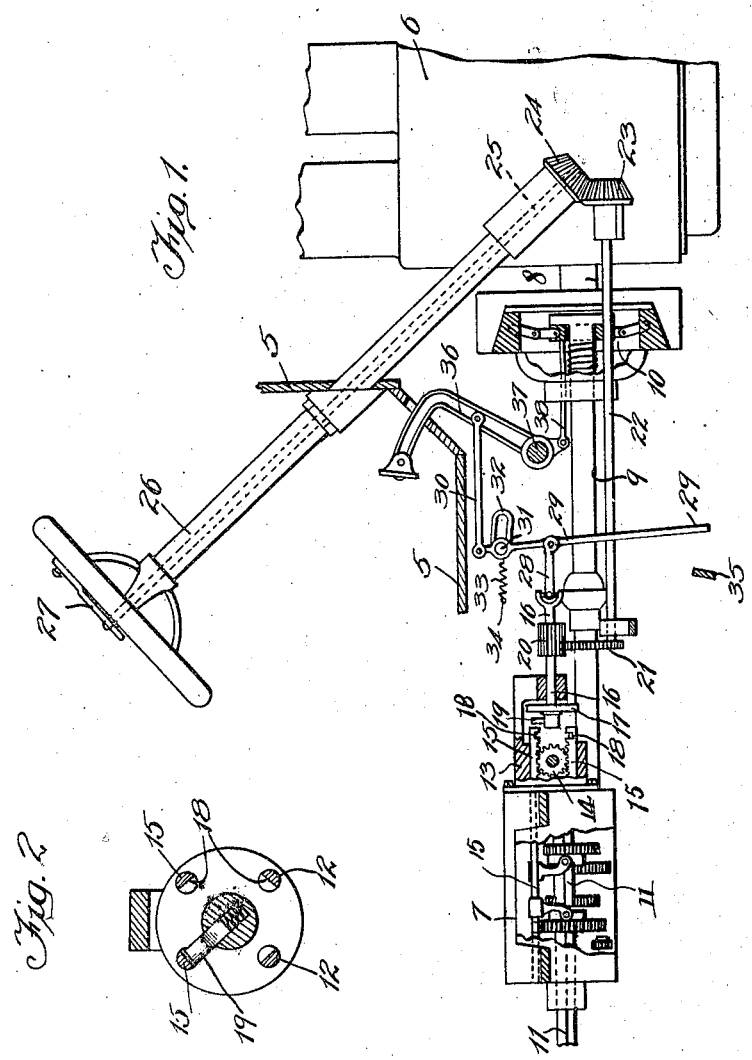
Witnesses:
W. T. Kilroy
Chas. Koursh.
Inventor
Edward E. Gray
By Brown, Hopkins, Nissen & Sprinkle
Atty's

UNITED STATES PATENT OFFICE.

EDWARD E. GRAY, OF PLANO, ILLINOIS, ASSIGNOR TO GRAY PNEUMATIC GEAR SHIFT COMPANY, A CORPORATION OF ILLINOIS.

GEAR-SHIFTING MECHANISM.

1,199,889.  Specification of Letters Patent.  Patented Oct. 3, 1916.

Application filed August 18, 1913. Serial No. 785,229.

*To all whom it may concern:*

Be it known that I, EDWARD E. GRAY, a citizen of the United States, residing at Plano, in the county of Kendall and State of Illinois, have invented certain new and useful Improvements in Gear-Shifting Mechanism, of which the following is a specification.

This invention relates particularly to a mechanical device for shifting the gears of an automobile transmission, but of course it may have a more general application to mechanism of this class.

The principal object of the invention is to provide mechanical means for shifting the gears of a slidable gear transmission mechanism into and out of engagement by the continuous action of a single member, as for example, the clutch pedal.

The invention consists in the features of novelty in the construction, combination and arrangement of the several parts generally shown in the accompanying drawings and described in the specification, but more particularly pointed out in the appended claims.

In the drawings, Figure 1 is a side elevation partly in section of mechanism constructed in accordance with and embodying the features of my invention, and Fig. 2 is a detail view of some of the gear shifting and selecting parts.

It is common practice to shift the gears of a transmission mechanism by means of a lever operated by hand. The present invention relates to means for shifting the gears into and out of driving engagement by the continuous movement in a single direction of an element, preferably a clutch pedal, by means of which the gear shifting mechanism is operated first to place the shiftable gears in neutral position and then by the continued movement of the same element to operate the gear shifting mechanism to place the gears in a driving connection which has been previously selected by means of an arm at the top of the steering wheel or at any other suitable place.

The reference numeral 5 designates generally the floor and dash of an automobile to which the present invention is applied, the engine, shown in part, being represented by the numeral 6, and 7 designating generally a sliding gear transmission mechanism of any well known construction. Connected to the engine is an engine shaft 8 and connected with the transmission gears is a power shaft 9, a clutch 10 of any well known construction being adapted to form a releasable driving connection between the shaft 8 and 9. Extending from the transmission gearing is a driving shaft 11 by means of which the power is transmitted to the driving wheels. Extending out of the transmission gear case are rods 12 by means of which the gears are shifted, and mounted in a suitable member 13 at the end of the transmission case are pinions 14 which mesh with racks in the rods 12 and also the racks in corresponding rods 15. These rods extend outwardly from the member 13 and when the gears are in neutral position the rods 12 and 15 are all disposed with their outer extremities in the same plane. A rotatable and longitudinally movable shaft is mounted parallel with and between the extremities of the rods. The shaft is provided with a plate 17 which engages the ends of the rods to return them to neutral when the shaft 16 is moved longitudinally. The extremities of the rods are provided with notches 18 in which a spring-pressed dog 19 carried by the shaft and rotatable with it is adapted to engage selectively by the rotation of the shaft. The shaft is rotated by means of a gear 20 secured thereto with which a geared segment 21 meshes, the segment being carried by a shaft 22 having a gear 23 at its other end meshing with a gear 24 on a shaft 25 which extends upwardly through a steering post 26. To the upper end of the shaft an arm 27 is secured by means of which the segment 21 is rotated to produce a corresponding rotation of the shaft 16 and the consequent engagement of the dog 19 to any of the rods 12 or 15; the position of the dog being indicated by a segment, not shown, at the top of the steering wheel. A link 28 is connected to the end of the shaft 16 by means of universal connection and the link is pivotally connected to a lever 29 at a point intermediate the ends thereof. A link 30 is connected to one extremity of the lever 29, and between this extremity and the point of pivotal connection of the link 23 is a yielding and shiftable pivot or fulcrum for the lever. This yielding pivot construction may be of any form as, for example, comprising a pivot pin 31 slidable in a fixed slotted member 32 with a spring 33 connected at one end to the lever and at the other end to a fixed point 34. Adjacent the other extremity of the lever is a fixed stop 35 which engages the extremity of the lever and forms a fixed pivot about which the lever may move.

A pedal 36 is pivotally mounted upon a shaft or other suitable support 37 and one extremity of the link 30 is connected thereto. The pedal 36 may be separate and distinct but preferably controls the operation of the clutch 10 by means of a member 38 connected thereto. It is understood, of course, that the clutch spring tends to maintain the connection between the shafts 8 and 9, and the depression of the pedal 36 acts against the clutch spring and releases the clutch.

In operation the depression of the pedal 36 causes the movement of the lever 29 first about the pivot pin 31 in a direction to move the shaft 16 rearwardly to return the rods 12 and 15 to their neutral position, the other extremity of the lever 29 engaging the fixed stop 35, and the continued depression or movement of the pedal 26 will cause the spring 33 to be overcome and the pin 31 to slide in the slotted member 32 carrying the shaft 16 outwardly. The result, therefore, upon the depression of the pedal is first to move the shaft 16 in one direction and then by the continuous movement of the pedal in the same direction to move it in the other direction. The forward movement of the pedal throws out the clutch so that in depressing the pedal the clutch is thrown out, the shiftable transmission gears are returned to neutral and the continued movement of the pedal moves the shaft 16 outwardly and with it any one of the rods 12 or 15 which have been selected by means of the selecting mechanism, so that with the pedal fully depressed the clutch is out and the transmission gears are in a previously selected driving connection. As soon as the pedal is released the tension of the clutch spring draws it up and completes the connection between the shafts 8 and 9 so that the transmission mechanism is in the selected driving condition. The selection can, of course, be made at any time, it being necessary only to depress the pedal and allow it to be returned by the clutch spring to place the driving gears in the selected driving engagement.

What I claim is:

1. Gear shifting mechanism comprising means movable in one direction to shift the gears and the other direction to return them to neutral, and a lever in connection with said means with a shiftable fulcrum to move the means in both directions.

2. Gear shifting mechanism comprising means movable in one direction to shift the gears and in the other direction to return them to neutral, and a lever in connection with said means having a shiftable fulcrum to move the means in both directions by moving the lever in a single direction.

3. Gear shifting mechanism comprising means movable in one direction to shift the gears in the other direction to return them to neutral, and a lever connected intermediate its ends to said means and operative by a movement in one direction to move the said means in both directions.

4. Gear shifting mechanism comprising means movable in one direction to shift the gears into and in the other direction to shift them out of driving connection, and a lever with a yieldable fulcrum connected to said means and operative to move the means in both directions by the movement of the lever in a single direction.

5. Gear shifting mechanism comprising means movable in one direction to shift the gears into and in the other direction to shift them out of driving connection, and a lever with a yieldable fulcrum connected to said means and operative to move the means in one direction by predetermined movement of the lever and in the other direction by a continued movement of the lever in the same direction.

6. In gear shifting mechanism, the combination with means movable in both directions to shift the gears into and out of driving connection, of a lever connected thereto having a yielding fulcrum and operative during a portion of its movement in one direction to move the said means in one direction and during another portion of its movement in the same direction to move the means in the other direction.

7. In gear shifting mechanism, the combination with means movable in both directions to shift the gears into and out of driving connection, a lever connected thereto intermediate its ends, and a yieldable pivot about which said lever is movable to move the means in one direction.

8. In gear shifting mechanism, means movable in both directions to shift the gears into and out of driving connection, a lever connected to said means intermediate its ends, a yieldable pivot adjacent one end of the lever about which it is rotatable, and means to move the lever about a fulcrum adjacent the other end.

9. In gear shifting mechanism, means movable in both directions to shift the gears into and out of driving connection, a lever connected to said means intermediate its ends, a yieldable pivot adjacent one end of the lever about which it is rotatable, and means to overcome the yielding pivot and to move the lever about a fulcrum adjacent the other end.

10. In gear shifting mechanism, the combination with means movable in both directions to shift the gears into and out of driving connection, of a lever pivoted intermediate its ends to said means, a link connecting the lever at one end to a source of power, means intermediate this end and the point of connection with said means forming a yieldable fulcrum for said lever, and means adjacent the other end of the lever constituting a fulcrum when the said yielding fulcrum has been overcome by power applied to the link.

11. In gear shifting mechanism, the combination with means for shifting the gears into and out of driving connection, of a lever connected thereto, a power link connected to the lever at one end, means forming a shiftable fulcrum for the lever between the end adjacent the link and the point of connection with said means, and a stop adjacent the other end of the lever adapted to be engaged by this end of the lever when the lever is moved by the shiftable fulcrum, whereupon the continued movement of the lever in the same direction will cause it to be moved about the stop as the fulcrum.

12. In gear shifting mechanism a lever for shifting the gears into and out of driving connection, said lever having means for operatively connecting it to the gears intermediate its ends, a shiftable pivot for the lever adjacent one end, and a stop to engage the lever at the other end whereby when the lever is moved continuously in one direction at one end, the intermediate portion of the lever will be moved first in the opposite direction and then in the same direction as the end of the lever at which the power is applied.

13. In gear shifting mechanism, the combination with means to move the gears into and out of driving connection, of selective means for choosing the desired driving connection, and a single lever connected to the means for moving the gears and operative by a movement of one end in a single direction first to move the gears out of driving connection and by a continued movement to move them into a previously selected driving connection.

14. In gear shifting mechanism, the combination with means for moving the gears into and out of driving connection, of selective means for choosing the desired driving connection, a lever connected intermediate its ends to the gear shifting means and having a shiftable fulcrum adjacent one end and a fixed fulcrum adjacent the other end, and a pedal connected to the end of the lever adjacent the shiftable fulcrum and operative to move the lever first about the shiftable fulcrum and then about the fixed fulcrum.

15. In gear shifting mechanism, the combination with separately rotatable driving elements, gears shiftable into different driving engagements between the elements, a clutch connecting some of the driving elements, means for shifting the gears into and out of driving engagement, selecting means for choosing the desired connection of the gears, a lever connected to the gear shifting means having a fixed fulcrum at one end and a shiftable fulcrum adjacent the other end, a pedal for releasing the clutch, and a link connecting the pedal with one end of the lever whereby a movement of the lever to release the clutch will first rotate the lever about the shiftable fulcrum to throw the shiftable gears out of driving engagement, and the continued movement of the pedal in the same direction will cause the lever to be rotated about its fixed fulcrum whereby previously selected gears will be shifted into driving connection.

16. In gear shifting mechanism, the combination with gear shifting rods, of a rotatable shaft, a gear secured thereto, a plate adapted to engage the ends of the rods to return them to neutral, means in connection with the shaft to engage any one of the rods to move it with the shaft in one direction, a selector arm, means in connection with the selector arm to rotate the gear on the shaft whereby any one of the rods may be engaged by said engaging means, a lever connected intermediate its ends to said shaft, means forming a yieldable fulcrum for the lever against one end, said means comprising a slotted link, a pivot pin connected to the lever and slidable in the link, and a spring connected to the lever tending to hold it at one end of the link, a stop at the other end of the lever forming a fixed fulcrum therefor, a pedal, and a link connecting the pedal with the end of the lever adjacent the shiftable connection.

17. In gear shifting mechanism, the combination of gears movable in opposite directions to place them in and out of driving connection, and a lever having a shiftable fulcrum and adapted to move the gears in both directions.

18. In gear shifting mechanism, the combination of gears movable in opposite directions to place them in and out of driving connection, and a lever having a shiftable fulcrum and adapted to move each movable gear in both directions by moving the lever in a single direction.

19. Gear shifting mechanism comprising a clutch, an operating member, a lost motion connection between the clutch and the operating member, shiftable gears, bars for moving the shiftable gears, a rotatable and longitudinally movable plunger adapted to engage any one of the bars, and selecting means to rotate the plunger for engagement with any one of the bars.

In testimony whereof I have signed my name to this specification, in the presence of two subscribing witnesses, on this 13th day of August A. D. 1913.

EDWARD E. GRAY.

Witnesses:
ALLENA OFFUTT,
KENT W. WONNELL.